US008572694B2

(12) United States Patent
Chang et al.

(10) Patent No.: US 8,572,694 B2
(45) Date of Patent: *Oct. 29, 2013

(54) INTEGRATED SECURITY ROLES

(75) Inventors: David Yu Chang, Austin, TX (US); Ching-Yun Chao, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1064 days.

This patent is subject to a terminal disclaimer.

(21) Appl. No.: 12/049,139

(22) Filed: Mar. 14, 2008

(65) Prior Publication Data

US 2008/0295147 A1  Nov. 27, 2008

Related U.S. Application Data

(63) Continuation of application No. 10/401,334, filed on Mar. 27, 2003, now Pat. No. 7,454,786.

(51) Int. Cl.
*H04L 29/06* (2006.01)
(52) U.S. Cl.
USPC .................................................. 726/4
(58) Field of Classification Search
USPC ........................................ 726/4, 14
See application file for complete search history.

(56) References Cited

U.S. PATENT DOCUMENTS

| | | | |
|---|---|---|---|
| 5,708,812 A | 1/1998 | Van Dyke et al. | 717/171 |
| 5,768,519 A | 6/1998 | Swift et al. | 709/223 |
| 5,930,801 A | 7/1999 | Falkenhainer et al. | 707/103 |
| 6,023,765 A | 2/2000 | Kuhn | 713/200 |
| 6,044,466 A | 3/2000 | Anand et al. | 713/200 |
| 6,067,623 A | 5/2000 | Blakley, III et al. | 713/201 |
| 6,073,242 A | 6/2000 | Hardy et al. | 726/1 |
| 6,202,066 B1 | 3/2001 | Barkley et al. | 707/9 |
| 6,263,442 B1 | 7/2001 | Mueller et al. | 726/3 |
| 6,289,462 B1 | 9/2001 | McNabb et al. | 713/201 |
| 6,308,273 B1 | 10/2001 | Goertzel et al. | 726/9 |
| 6,339,423 B1 | 1/2002 | Sampson et al. | 715/854 |
| 6,385,724 B1 | 5/2002 | Andrews et al. | 713/167 |
| 6,412,070 B1 | 6/2002 | Van Dyke et al. | 713/200 |
| 6,453,353 B1 | 9/2002 | Win et al. | 709/229 |
| 6,466,932 B1 | 10/2002 | Dennis et al. | 707/3 |
| 6,526,513 B1 | 2/2003 | Shrader et al. | 710/240 |
| 6,574,736 B1 * | 6/2003 | Andrews | 726/21 |
| 6,708,276 B1 | 3/2004 | Yarsa et al. | 713/201 |
| 6,950,825 B2 | 9/2005 | Chang et al. | 707/1 |
| 7,010,600 B1 | 3/2006 | Prasad et al. | 709/225 |
| 2001/0014943 A1 | 8/2001 | Wray | 713/157 |

(Continued)

OTHER PUBLICATIONS

Epstein et al., "Engineering of Role/Permission Assignments," Computer Security Applications Conference $17^{th}$, Dec. 10-14, 2001, p. 127-36.

(Continued)

*Primary Examiner* — Shaun Gregory
(74) *Attorney, Agent, or Firm* — Van Leeuwen & Van Leeuwen; Jeffrey S. LaBaw (57) ABSTRACT

An approach to handling integrated security roles is presented. An upstream application includes one or more role-mapping requirements that correspond to an upstream security role and a downstream security role. The upstream security role is expanded by adding an upstream security role identifier in a downstream application's role-mapping table or by adding upstream user-to-role mappings to a downstream application's role-mapping table. When an upstream security role is expanded, a user assigned to the upstream security role automatically has access to role-mapped downstream applications.

19 Claims, 8 Drawing Sheets

(56) References Cited

U.S. PATENT DOCUMENTS

| | | | | |
|---|---|---|---|---|
| 2002/0010679 | A1 | 1/2002 | Felsher | 705/51 |
| 2002/0019936 | A1 | 2/2002 | Hitz et al. | 713/165 |
| 2002/0026592 | A1 | 2/2002 | Gavrila et al. | 713/201 |
| 2002/0112155 | A1 | 8/2002 | Martherus et al. | 713/155 |
| 2002/0152212 | A1 | 10/2002 | Feldman | 707/9 |
| 2003/0023880 | A1 | 1/2003 | Edwards et al. | 713/201 |
| 2003/0084324 | A1 | 5/2003 | Koved et al. | 713/200 |
| 2003/0084325 | A1 | 5/2003 | Koved et al. | 713/200 |
| 2003/0225765 | A1* | 12/2003 | Frieden et al. | 707/9 |
| 2003/0229812 | A1* | 12/2003 | Buchholz | 713/202 |
| 2004/0128559 | A1 | 7/2004 | Zurko et al. | 713/202 |
| 2004/0186836 | A1 | 9/2004 | Schlesinger | 707/9 |

OTHER PUBLICATIONS

"Mapping Roles to Groups and Users," www.orionserver.com, downloaded Nov. 20, 2002 (2 pages).

Lowy, J., "Unify the Role-based Security Models for Enterprise and Application Domains with .Net", msdn magazine, May 2002, p. 58-64 (missing page contains advertisements).

A.C. Kapadia, "A Dynamic Role Translation Model for Secure Interoperability," Internet: URL: http://citeseer.ist.psu.edu/kapadia01irbac.html, 2001 (41 pages).

* cited by examiner

INTEGRATED SECURITY ROLES

RELATED APPLICATIONS

This application is a continuation application of U.S. Non-Provisional patent application Ser. No. 10/401,334, entitled "System and Method for Integrated Security Roles," filed on Mar. 27, 2003 now U.S. Pat. No. 7,454,786.

BACKGROUND OF THE INVENTION

1. Technical Field

The present invention relates in general to a system and method for integrating security roles across application boundaries. More particularly, the present invention relates to a system and method for expanding a security role by mapping an upstream security role to a downstream security role.

2. Description of the Related Art

Computer systems use various techniques for user authorization. A computer system typically authenticates and authorizes a user when the computer system receives a request from the user. For example, a user may access his bank account information and a banking application proceeds through a series of steps to authenticate and authorize the user, such as requesting a user identifier and a password from the user. The computer system may also require authorization to access downstream applications. Using the example described above, the banking application (i.e. upstream application) may call a downstream application to retrieve account information corresponding to the user's request whereby the downstream application requires user identification information in order to grant access.

Java 2 Enterprise Edition (J2EE) includes a security role-based access control mechanism for user request authorizations. A security role may be viewed as a collection of Enterprise Java Bean (EJB) method permissions along with read/write access permissions to URL pages. EJB beans and URL pages are packaged together into a J2EE application in order to build a functionality set that solves a business problem. System administrators map individual user identifiers as well as group identifiers to each security role in order to provide each user and group with required permissions to access business functions.

A challenge found with mapping users to applications, however, is that different developers or vendors create separate J2EE applications that are integrated into a larger business application. Security roles are typically defined within an application's boundary that, in turn, allows business applications to be developed in a modular fashion. For example, a business operation may be partitioned into a set of components and different groups may develop the components separately. A group that develops a particular module may not be aware of users that require access from other modules.

Furthermore, a challenge found with manually managing user-to-role mapping in a modular system for downstream applications is that it becomes non-trivial and complex. For example, a workflow user request may be handled by a number of J2EE applications. When this occurs, the user's identity is mapped to security roles corresponding to each application in order to provide the user with access.

What is needed, therefore, is a system and method that automatically maps an upstream application's security roles to a downstream application's required security role and, conversely, maps downstream application security roles to upstream security roles. Moreover, what is needed is a system and method to more effectively provide users with access across application boundaries.

SUMMARY

It has been discovered that the aforementioned challenges are resolved by expanding an upstream security role to include a collection of permissions of a downstream application. The upstream security role is expanded by adding an upstream security role identifier to a downstream application's role-mapping table or by adding upstream user-to-role mappings to a downstream application's role-mapping table. When an upstream security role is expanded, a user assigned to the upstream security role automatically has access to role-mapped downstream applications.

Processing identifies role-mapping requirements between an upstream security role and one or more downstream security roles. The upstream security role corresponds to an upstream application and the downstream security role corresponds to a downstream application. The upstream application and downstream application may be located on a single server or each application may be located on separate servers and communicate over a computer network, such as a LAN or the Internet.

The upstream security role is mapped to the downstream security role using an upstream security role identifier. The upstream security role identifier is included in one of the downstream security role's authorization table entries. Once the upstream security role identifier is included in one of the downstream security role's authorization table entries, the upstream application may send a request to the downstream application that includes a user identifier and a user's assigned upstream security roles. The downstream application grants access to the user by matching the user's assigned upstream security roles included in the request with one of the downstream security role's authorization table entries.

An upstream security role may also be mapped to a downstream security role by adding the upstream security role user-to-role mappings (i.e. user identifiers and group identifiers) to a downstream application's role-mapping table (e.g. authorization table entries). Once processing adds the upstream security role user-to-role mappings to the downstream application's role-mapping table, the upstream application may send a request to the downstream application that includes a user identifier without sending assigned upstream security role identifiers. The downstream application grants access by matching the user identifier included in the request with one of the downstream security role authorization table entries.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
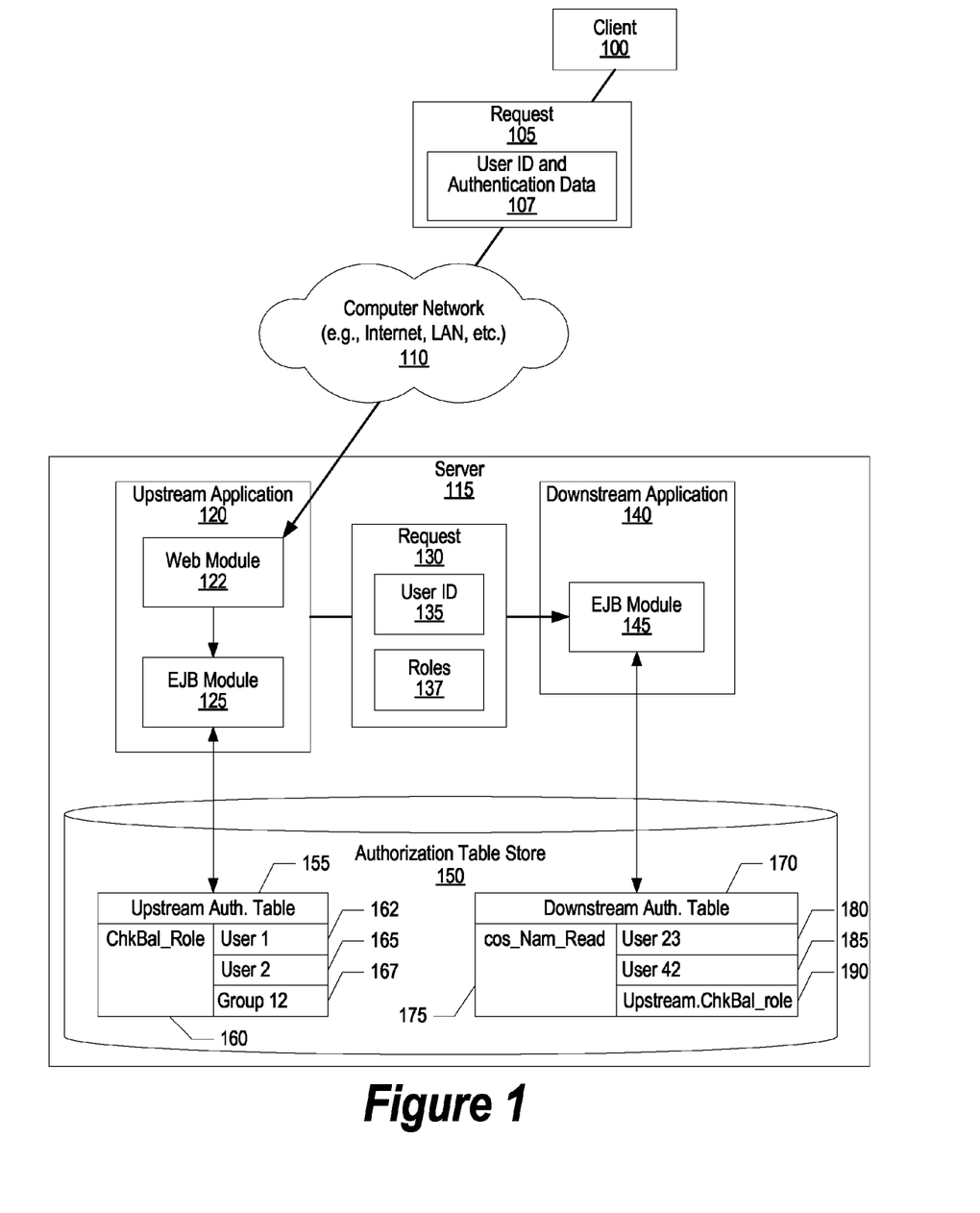
FIG. 1 is a diagram showing an upstream application sending an application request that includes upstream security roles to a downstream application.

FIG. 1 is a diagram showing upstream application 120 sending application request 130 which includes upstream security role 137 to downstream application 140. The downstream application's corresponding downstream authorization table 170 has been role-mapped with an upstream security role identifier which corresponds to the upstream security role. The example in FIG. 1 shows that downstream authorization table 170 includes an upstream security role identifier in downstream authorization table entry 190 (see FIGS. 3A, 4, 5, 6, and corresponding text for further details regarding role-mapping additions).

Client 100 sends request 105 to server 115 through computer network 110, such as the Internet. For example, client 100 may wish to check a bank account balance which is accessed using server 115. Request 105 includes user data 107 that server 115 uses to authenticate and authorize client 100. For example, user data 107 may include a user identifier, a password, a digital certificate, or other information used to authenticate and authorize the client.

Server 115 includes upstream application 120 which interfaces with client requests. Using the example described above, upstream application 120 may be an online banking application which allows users to check bank account balances, deposit funds, and withdraw funds. Upstream application 120 includes web module 122 and EJB (Enterprise Java Bean) module 125. Web module 122 provides a user interface to client 100 (e.g. web page) and also authenticates client 100 using client 100's authentication data included in request 105 (e.g. a digital certificate). Once web module 122 authenticates client 100, web module 122 calls EJB module 125 to further process request 105.

Enterprise Java Bean (EJB) modules authorize a user's request based upon the user's assigned security roles. Using the example described above, EJB module 125 authorizes client 100 to check bank account balances if client 100 is assigned a "CheckBalance" role. In the example shown in FIG. 1, EJB module 125 grants user authorization if client 100 is assigned the appropriate upstream security role 160 stored in data store 150. EJB module 125 accesses upstream authorization table 155 located in authorization table store 150 during user authorization steps. Upstream authorization table 155 includes upstream security role 160 and corresponding upstream authorization entries 162, 165, and 167. Upstream authorization table entries 162 and 165 include entries that are user identifiers whereas upstream authorization table entry 167 includes an entry that is a group identifier. Authorization table store 150 may be stored on a non-volatile storage area, such as a computer hard drive.

EJB module 125 determines whether to grant access to client 100 by comparing client 100's user identifier included in user data 107 with upstream authorization table entries 162, 165, and 167.

Once EJB module 125 grants access to client 100, EJB module 125 determines that it should call downstream application 140 to handle the request. Using the example described above, the online banking application determines that it should call a naming space management application in order to look-up user account information from a naming space. EJB module 125 sends request 130 to downstream application 140. Request 130 includes user identifier 135 and roles 137. User identifier 135 identifies client 100 and roles 137 includes identifiers corresponding to client 100's upstream security roles, such as upstream security role 160.

In one embodiment, downstream application 140 may be located on a separate server and roles 137 is included in a security context that is sent to the server hosting the downstream application over a computer network, such as a LAN or the Internet.

Downstream application 140 includes EJB module 145 which receives and analyzes request 130. EJB module 145 determines that client 100 requires a particular security role assignment in order for EJB module 145 to grant access. Using the example described above, EJB module 145 grants access to look-up the user's bank account information from the naming space if the requester is assigned downstream security role 175. EJB module 145 accesses downstream authorization table 170 that includes downstream security role 175. EJB module 145 compares user identifier 135 and roles 137 with downstream authorization table entries 180, 185, and 190. Downstream authorization table entries 180 and 185 include downstream subjects that are user identifiers whereas downstream authorization table entry 190 includes an upstream security role identifier corresponding to upstream security role 160. EJB module 145 determines that the upstream security role included in roles 137 matches the upstream security role identifier included in downstream authorization table entry 190 and grants access to client 100.

Figure 2:
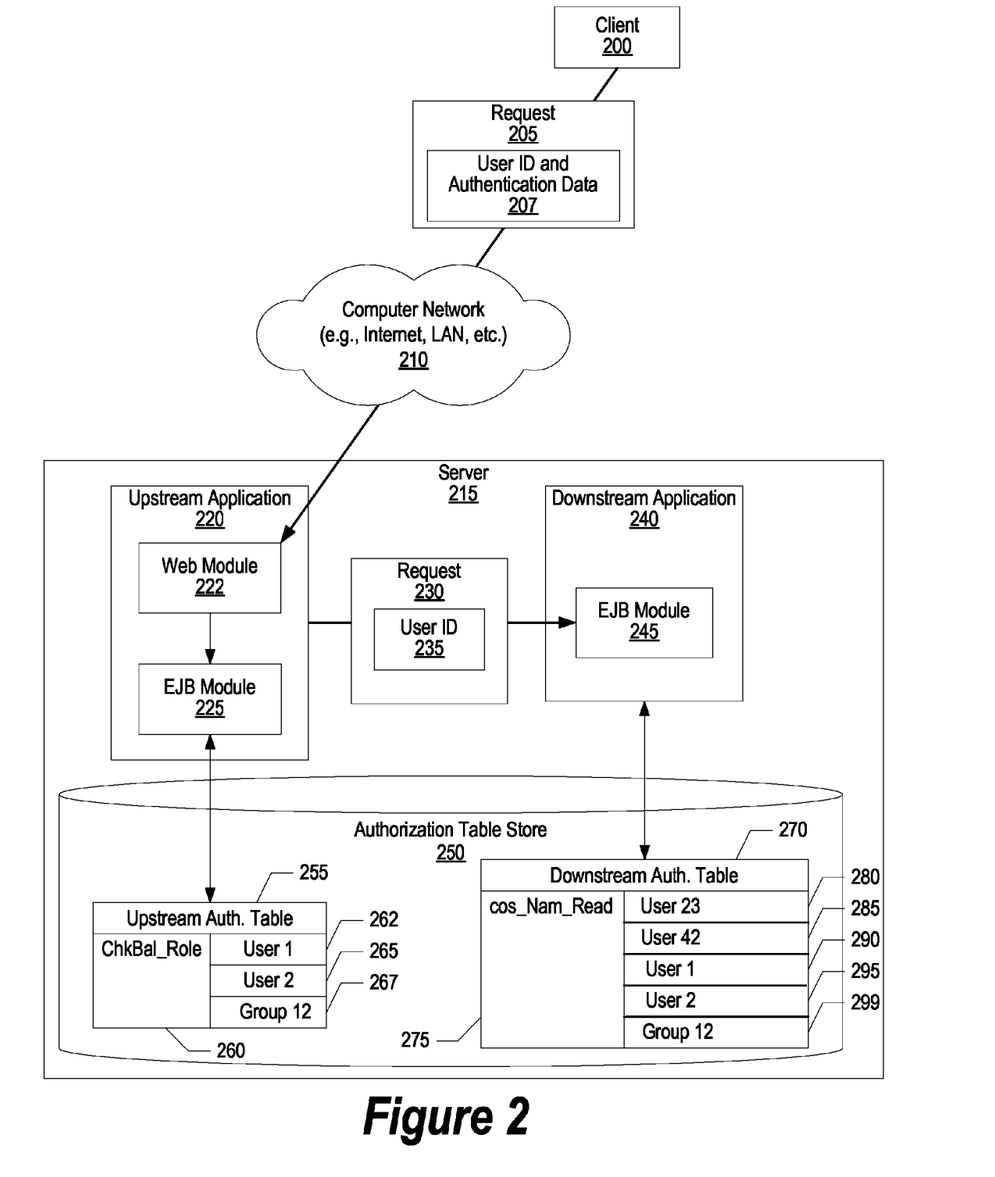
FIG. 2 is a diagram showing an upstream application sending a request to a downstream application wherein the downstream application's corresponding authorization table includes one or more upstream subjects.
Figure 3A:
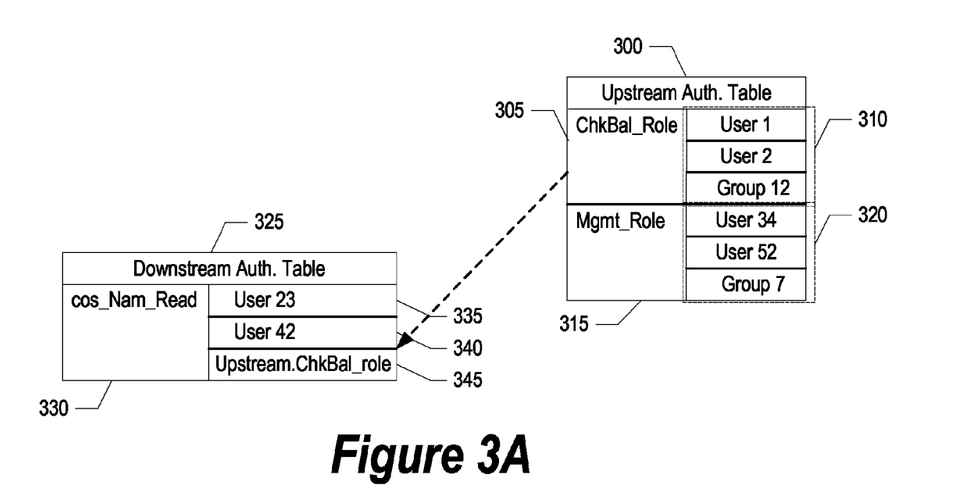
FIG. 3A is a diagram showing an upstream security role identifier included in a downstream authorization table entry during a role-to-role mapping process.
Figure 3B:
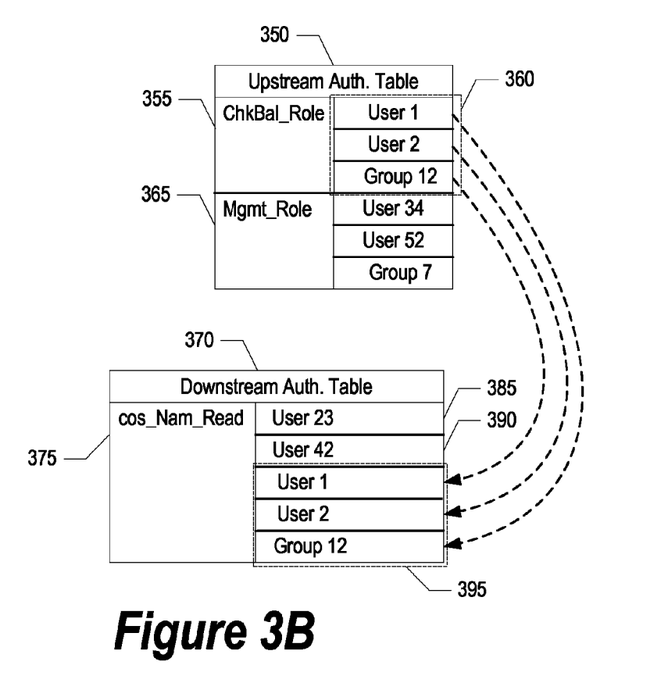
FIG. 3B is a diagram showing an upstream security role being mapped to a downstream security role by adding upstream security role user-to-role mappings to the downstream security role during a role-to-role mapping process.

In one embodiment, a computer system may map upstream subjects associated with a particular upstream security role to a downstream authorization table in lieu of adding an upstream security role identifier to the downstream authorization table (see FIGS. 2, 3B, and corresponding text for further details regarding upstream user-to-role mappings to downstream security roles).

FIG. 2 is a diagram showing an upstream application sending a request to a downstream application wherein the downstream application's corresponding authorization table includes one or more authorization table entries corresponding to the upstream application. FIG. 2 is the same as FIG. 1 with the exception that FIG. 2's downstream authorization table 270 was user-to-role mapped to an upstream security role (260) whereas FIG. 1's downstream authorization table 170 was role-mapped using an upstream security role identifier. In particular, downstream authorization table 270 includes authorization table entries 290, 295, and 299 that were added to downstream authorization table 270 during a user-to-role mapping process (see FIG. 3B and corresponding text for further details regarding user-to-role mappings).

Since downstream authorization table 270 was user-to-role mapped to upstream security role 260, request 230 does not included client 200's assigned upstream security roles whereas FIG. 1's request 130 included client 100's assigned upstream security roles (e.g. roles 137).

FIG. 3A is a diagram showing an upstream security role identifier included in a downstream authorization table entry during a role-to-role mapping process. Upstream authorization table 300 includes upstream security role 305 that requires role-mapping to downstream security role 330. One approach to interpret role-to-role mapping is that by role-mapping an upstream security role to a downstream security role, the downstream security role's permissions are included in the upstream security role. For example, if a user is assigned an upstream security role, the user is automatically granted access to a downstream security role that has been role-mapped to the upstream security role.

A server accesses upstream authorization table 300 which includes security role 305 and security role 315 during a role-to-role mapping process. Authorization table entries 310 include entries corresponding to security role 305 and authorization table entries 320 include entries corresponding to security role 315.

The server accesses downstream authorization table 325 during role-to-role mapping and selects upstream security role 305 to map to downstream security role 330. Downstream security role 330 includes authorization table entries 335 and 340. The server adds authorization table entry 345 to downstream security role 330 in order to "role-map" upstream security role 305 to downstream security role 330. Downstream authorization entry 345 includes an upstream security role identifier corresponding to upstream security role 305. Downstream security role 330 is now configured so a downstream application grants access to users that are assigned upstream security role 305 (see FIGS. 1, 7, and corresponding text for further details regarding downstream application access granting steps).

FIG. 3B is a diagram showing upstream security role 355 being mapped to downstream security role 375 by adding upstream security role user-to-role mappings (i.e. user identifiers and group identifiers) to the downstream security role during a role-to-role mapping process.

A server accesses upstream authorization table 350 which includes security role 355 and security role 365 during a role-to-role mapping process. Authorization table entries 360 include a collection of user-to-role mappings corresponding to security role 355. Each entry in a user-to-role mapping table includes a user, a group, or a security role identifier that has been assigned to upstream security role 355. The server accesses downstream authorization table 370 and selects downstream security role 375 to role-map upstream security role 355.

Downstream security role 375 includes authorization table entries 385 and 390. Authorization table entries 395 include new entries resulting from upstream security role 355's user-to-role mappings to downstream security role 375. Downstream security role 375 is now configured so the corresponding downstream application grants authorization to users that are assigned upstream security role 355 (see FIGS. 2, 7, and corresponding text for further details regarding downstream application authorization).

Figure 4:
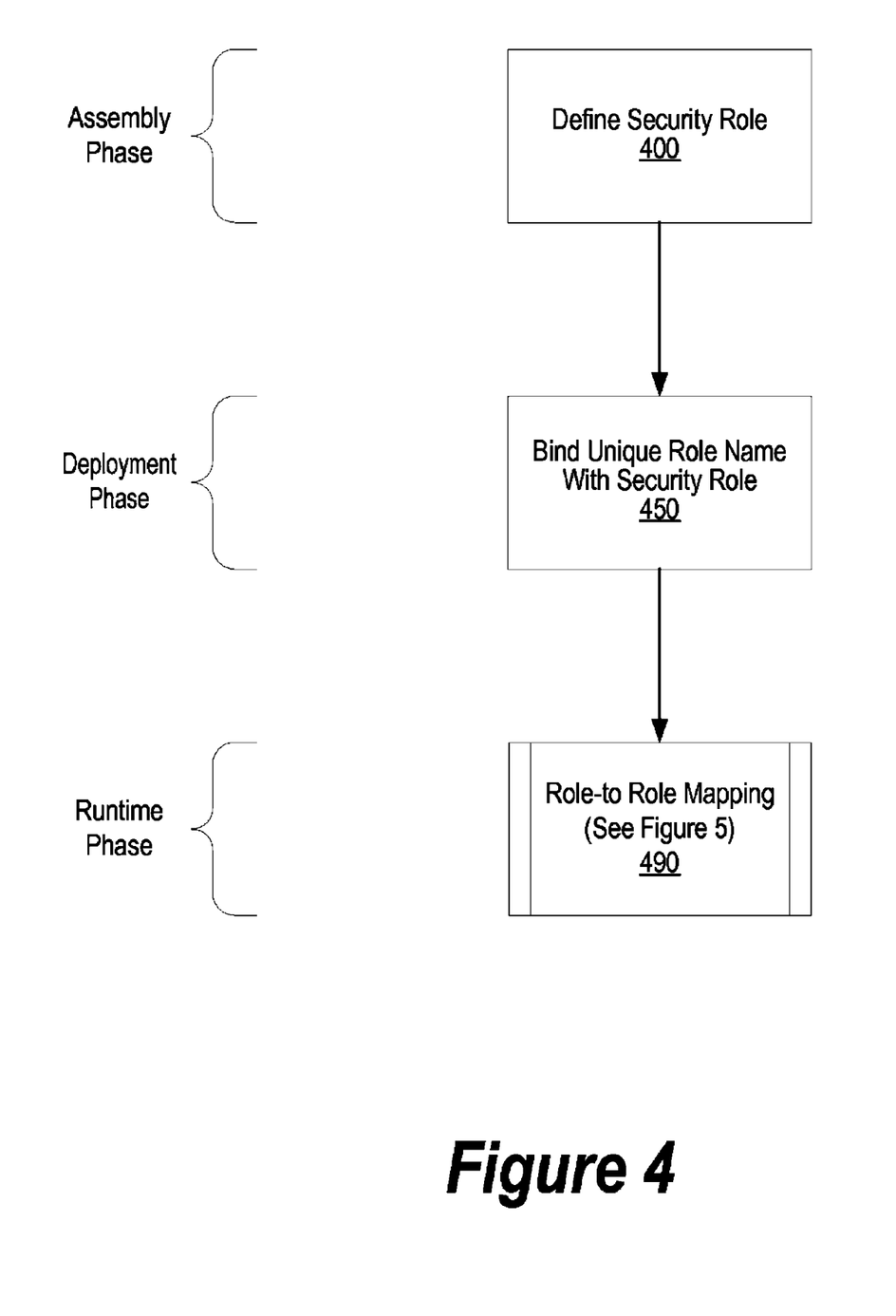
FIG. 4 is a high level flow chart showing steps taken in preparing code and updating security roles during phases in an application's lifecycle.

FIG. 4 is a high level flow chart showing steps taken in preparing code and updating security roles during phases in an application's lifecycle. An application's life cycle includes an application development phase (e.g. design and coding), an assembly phase (e.g. packaging and defining policy and reference), a deployment phase (e.g. installation and filling in binding information), and a runtime phase (i.e. execution). The phases described above are J2EE terminology and as one skilled in the art can appreciate, other software development systems may be used to implement this invention.

An application developer is aware that his application (i.e. upstream application) requires access service from other applications (i.e. downstream applications). Therefore, the application developer defines security role references to the downstream applications that his upstream application requires access (step 400). The application developer adds a security-role-reference extension to his code which defines a symbolic role name that may be used to reference security roles in downstream applications.

Since actual downstream security role names may not be known during an upstream application's assembly time, a security-role-reference element provides an indication that an upstream security role should be mapped to a downstream security role. Actual downstream security role names may be resolved during the upstream application's deployment phase (see below for further details). A "security-role-reference" may be defined as an extension in a J2EE deployment descriptor. The "security-role-reference" may be added to EJB modules and Web modules, and defined as follows:

<!ELEMENT security-role-ref (description?, security-role-ref-name)>

The element may include an optional "description" to describe the downstream application to provide role-to-role mapping guidance to an application deployer during a binding process (see below for further details regarding binding process).

The application developer may add another extension to the J2EE deployment descriptor to allow a bind between a downstream security role and the security-role-reference. For example, an application is uniquely identified by a cell name and its application name. A cell includes a number of application servers and is a basic unit for setting up a security policy. A security role is uniquely identified by a three-tuple, such as:

(cell name, application name, security role name)

A deployer, when installing a new application, resolves security-role-references by adding an element in into a binding extension to the J2EE deployment descriptor as follows:

<!ELEMENTS security-role-binding (security-role-ref-name, unique-role-name)>

The above statement binds a unique role name (a three-tuple) with the security-role-reference name defined by the assembler (step 450). An access control security policy that assigns users and user groups to security roles can be defined by the following element:

<!ELEMENT authorization (security-role-name, subject*)>

The security-role-name represents a security role defined for the downstream application. A subject may be a unique user identifier, a group identifier, a special subject, or a security-role-reference name. The security-role-reference name, when specified, means that the security role of a downstream application is assigned to the application.

An authorization table adheres to an application boundary and includes one or more authorization elements, one per security role. Depending on an administrator's preference, the server performs one of two approaches at runtime (step 490, see FIG. 5 and corresponding text for further details regarding role-to-role mapping). The first approach is to keep security-role-reference name assignments and require a user security context to include security role attributes (see FIGS. 1, 3A, and corresponding for further details security role attribute inclusion in a security context). The second approach is to expand the security-role-reference name into users, groups, and special subjects based on a downstream server's authorization policy (see FIGS. 2, 3B, and corresponding text for further details regarding subject additions).

In the first approach, a server looks-up security roles that are granted to a specified user by the intended application when authenticating that user. Security role attributes are added into the user's security credentials and are propagated to downstream applications or servers when sending downstream calls to downstream applications. New security roles that are granted to the user by the downstream application are also added to the user's security credentials.

In the second approach, the upstream application's role name that is in a downstream application's authorization table is replaced at runtime by the upstream application's authorization policy (i.e., user, group, special subject assignment). The security-role-binding element in the upstream application indicates that a security runtime should update the downstream application's authorization table whenever the upstream application's user-to-role binding is modified.

To avoid circular dependency, security role equivalency is implemented. If a security role is assigned to another security role and vice versa, then the two security roles are identified as equivalent. Once two security roles are identified as equivalent roles, processing ensures that the two corresponding authorization tables are identical. Role equivalence may also be applied to three or more security roles that are assigned to one another in a circular fashion. For example, role 1 is assigned to role 2, role 2 is assigned to role 3, and role 3 is assigned to role 1. In this example, all three roles are identified as equivalent roles.

Figure 5:
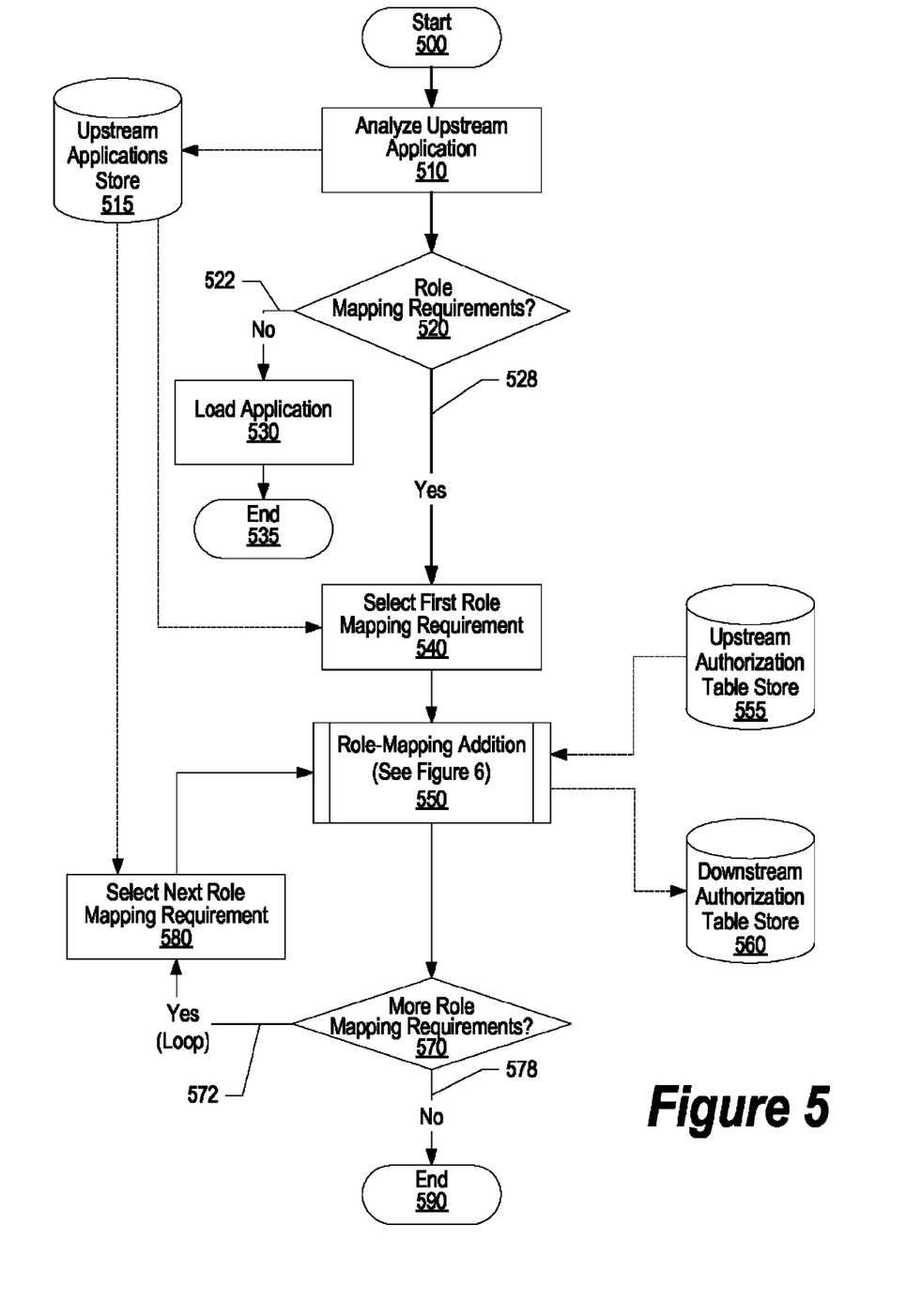
FIG. 5 is a flowchart showing steps taken in analyzing upstream applications and role-mapping upstream security roles to downstream security roles.

FIG. 5 is a flowchart showing steps taken in analyzing upstream applications and role-mapping upstream security roles to downstream security roles. Processing commences at 500, whereupon processing analyzes an upstream application located in upstream application store 515 to identify role-mapping requirements between the upstream application and one or more downstream applications (step 510). For example, an online banking application allows users to check bank account balances, deposit funds, and withdraw funds. In this example, three security roles are defined in the online banking application which are CheckBalance role, DepositFund role, and WithdrawFund role. In this example, the online banking application (i.e. upstream application) calls a naming space management application (i.e. downstream application) while executing user requests. In this example, the naming space management application includes four security roles which are CosNamingRead, CosNamingWrite, CosNamingCreate, and CosNamingDelete and in order for a user to perform a balance checking operation that requires the CheckBalance role in the online banking application, the user is also required to have read access to the naming space which requires the CosNamingRole role in the naming space management application. Upstream applications store 515 may be stored on a non-volatile storage area, such as a computer hard drive.

A determination is made as to whether the upstream application includes role-mapping requirements (decision 520). Processing identifies role-mapping requirements by analyzing extensions included in the upstream application (see FIG. 4 and corresponding text for further details regarding security role extensions).

If the upstream application does not include role-mapping requirements, decision 520 branches to "No" branch 522 whereupon the server loads the upstream application at step 530, and processing ends at 535. On the other hand, if the upstream application includes role-mapping requirements, decision 520 branches to "Yes" branch 528 whereupon processing selects a first role-mapping requirement included in the upstream application (step 540). The role-mapping requirement identifies an upstream security role to be mapped to a downstream security role.

The upstream security role includes upstream subjects (i.e. user identifiers, group identifiers, etc.) which are stored in an upstream authorization table, such as upstream authorization table store 555. The downstream security role includes downstream subjects which are stored in a downstream authorization table, such as downstream authorization table store 560. Upstream authorization table store 555 and downstream authorization table store 560 may be stored on a non-volatile storage area, such as a computer hard drive.

Processing role-maps the upstream security role to the downstream security role in one of two ways. The first approach is to keep security-role-reference name assignments and require a user security context (i.e. requests) to include upstream security role identifiers (see FIGS. 1, 3A, and corresponding text for further details regarding security role identifier propagation). The second approach is to expand security-role-reference names into users, groups, and special subjects based on a downstream server's authorization policy (pre-defined process block 550, see FIG. 6 and corresponding text for further details regarding role-mapping additions).

A determination is made as to whether the upstream application includes more role-mapping requirements (decision 570). The upstream application may include multiple role-mapping requirements corresponding to a single downstream application or the upstream application may include multiple role-mapping requirements corresponding to multiple downstream applications. If the upstream application includes more role-mapping requirements, decision 570 branches to "Yes" branch 572 which loops back to select (step 580) and process the next role-mapping requirement. This looping continues until the upstream application has no more role-mapping requirements to process, at which point decision 570 branches to "No" branch 578 whereupon processing ends at 590.

Figure 6:
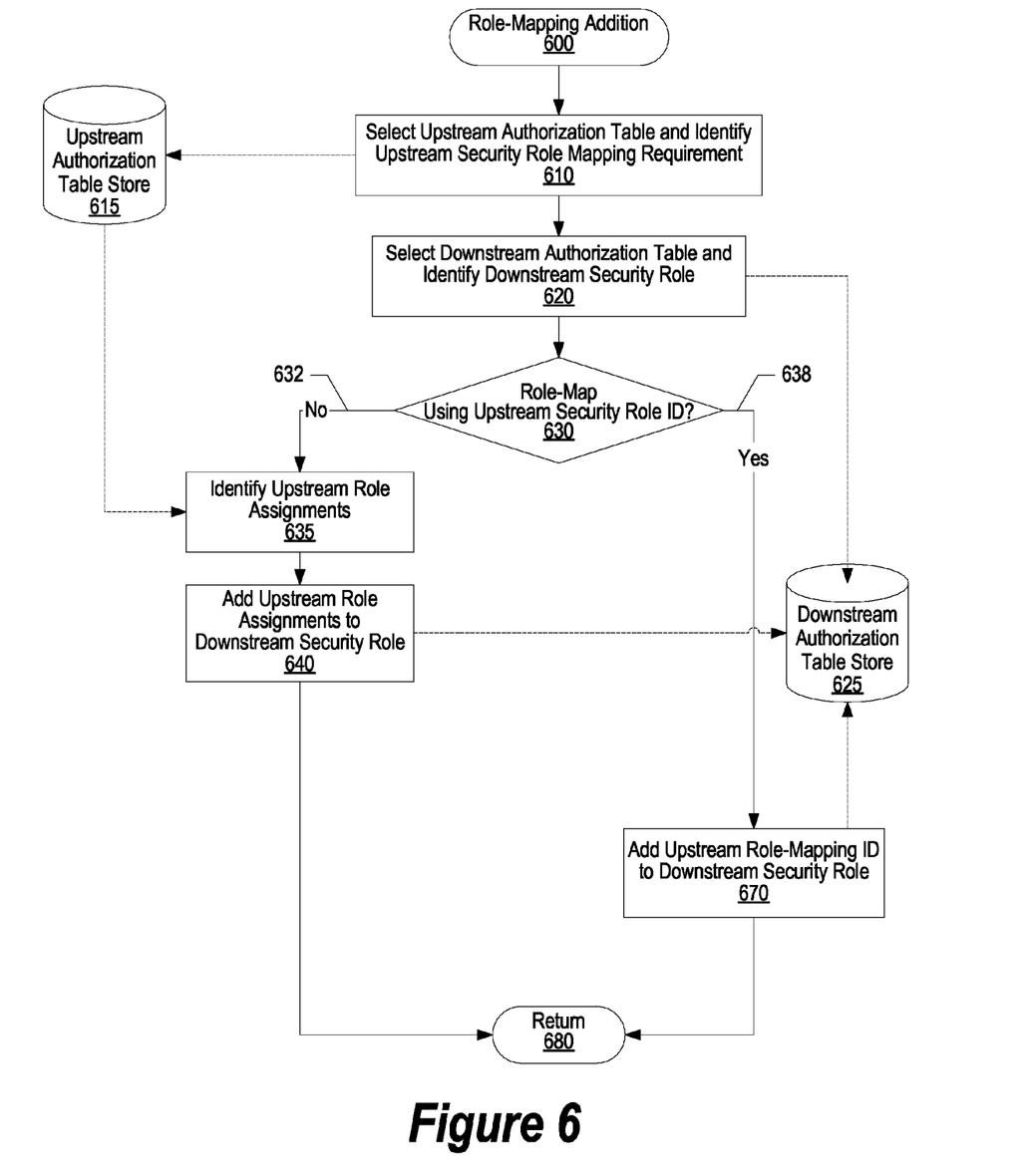
FIG. 6 is a flowchart showing steps taken in role-mapping upstream security roles to downstream security roles.

FIG. 6 is a flowchart showing steps taken in role-mapping upstream security roles to downstream security roles. Processing commences at 600, whereupon processing selects an upstream authorization table and identifies an upstream security role located in upstream authorization table store 615 (step 610). The selected upstream security role corresponds to a role-mapping requirement included in an upstream application). Upstream authorization table store 615 may be stored on a non-volatile storage area, such as a computer hard drive. Processing selects a downstream authorization table located in downstream authorization table store 625 which includes a downstream security role corresponding to the role-mapping requirement (step 620). Downstream authorization table store 625 may be stored on a non-volatile storage area, such as a computer hard drive.

A determination is made as to whether processing is configured to role-map the upstream security role to the downstream security role by either including an upstream security role identifier in the downstream authorization table or by including upstream security role user-to-role mappings in the downstream authorization table (decision 630) (see FIGS. 3A, 3B, 4, and corresponding text for further details regarding role-mapping options). If processing is configured to include an upstream security role identifier in the downstream authorization table, decision 630 branches to "Yes" branch 638 whereupon processing includes an upstream security role identifier in a downstream authorization table entry at step 670, and processing returns at 680 (see FIG. 3A and corresponding text for further details regarding upstream security role identifiers).

On the other hand, if processing is configured to include upstream security role assignments (i.e. user identifiers, group identifiers, etc.) in the downstream authorization table, decision 630 branches to "No" branch 632 whereupon processing identifies role assignments corresponding to the upstream security role (step 635). Processing adds the identified upstream role assignments to the downstream security role at step 640, and processing returns at 680.

Figure 7:
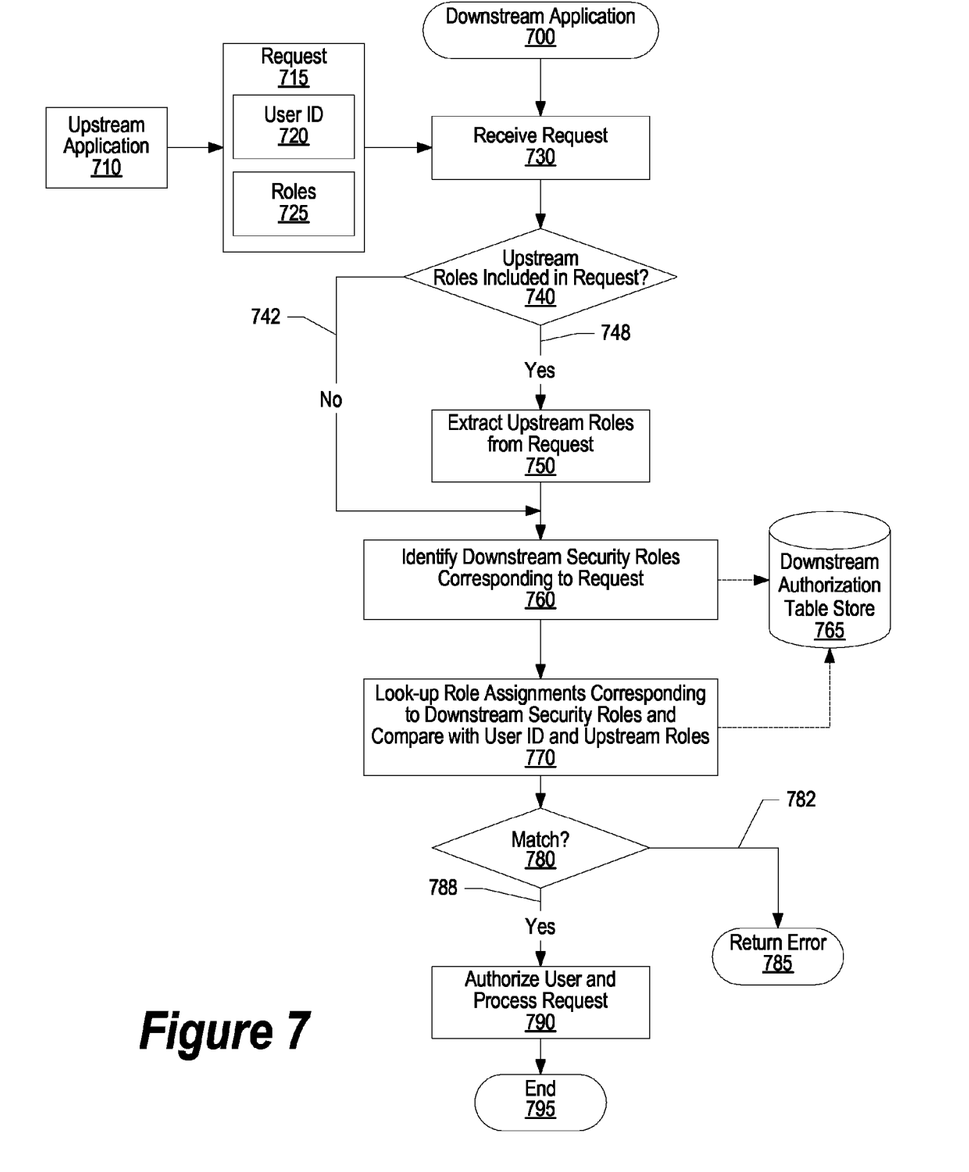
FIG. 7 is a flowchart showing steps taken in a downstream application authorizing a user with an upstream security role assignment.

FIG. 7 is a flowchart showing steps taken in a downstream application authorizing a user with an upstream security role assignment. Processing commences at 700, whereupon the downstream application receives request 715 from upstream application 710 (step 730). Request 715 includes user identifier 720 and may include roles 725. User identifier 720 identifies a requesting user and roles 725 includes upstream security role identifiers corresponding to the requesting user's upstream security role assignments.

A determination is made as to whether upstream security roles (e.g. roles 725) are included in request 715 (decision 740). If upstream security roles are not included in request 715, decision 740 branches to "No" branch 742 bypassing upstream role extraction steps. On the other hand, if request 715 includes upstream security roles, decision 740 branches to "Yes" branch 748 whereupon the downstream application extracts the upstream security roles from request 715 (step 750) and uses the upstream security roles in conjunction with user identifier 720 to determine authorization access (see below for further details).

Processing analyzes request 715 and identifies required downstream security roles for access authorization located in data store 765 (step 760). Data store 765 may be stored on a non-volatile storage area, such as a computer hard drive. Processing looks-up role assignments corresponding to the required downstream security roles and compares them with user identifier 720 and roles 725 (step 770). A determination is made as to whether processing matched user identifier 720 or roles 725 (if applicable) with one of the required downstream security role assignments (decision 780). If processing did not identify a match, decision 780 branches to "No" branch 782 whereupon an error is returned at 785. On the other hand, if processing identified a match, decision 780 branches to "Yes" branch 788 whereupon processing authorizes the user at step 790, and processing ends at 795.

In one embodiment, processing may require information from a second downstream application in order to process the upstream application's request. In this embodiment, processing includes the matched downstream security role in a second request and send the second request to a second downstream application.

Figure 8:
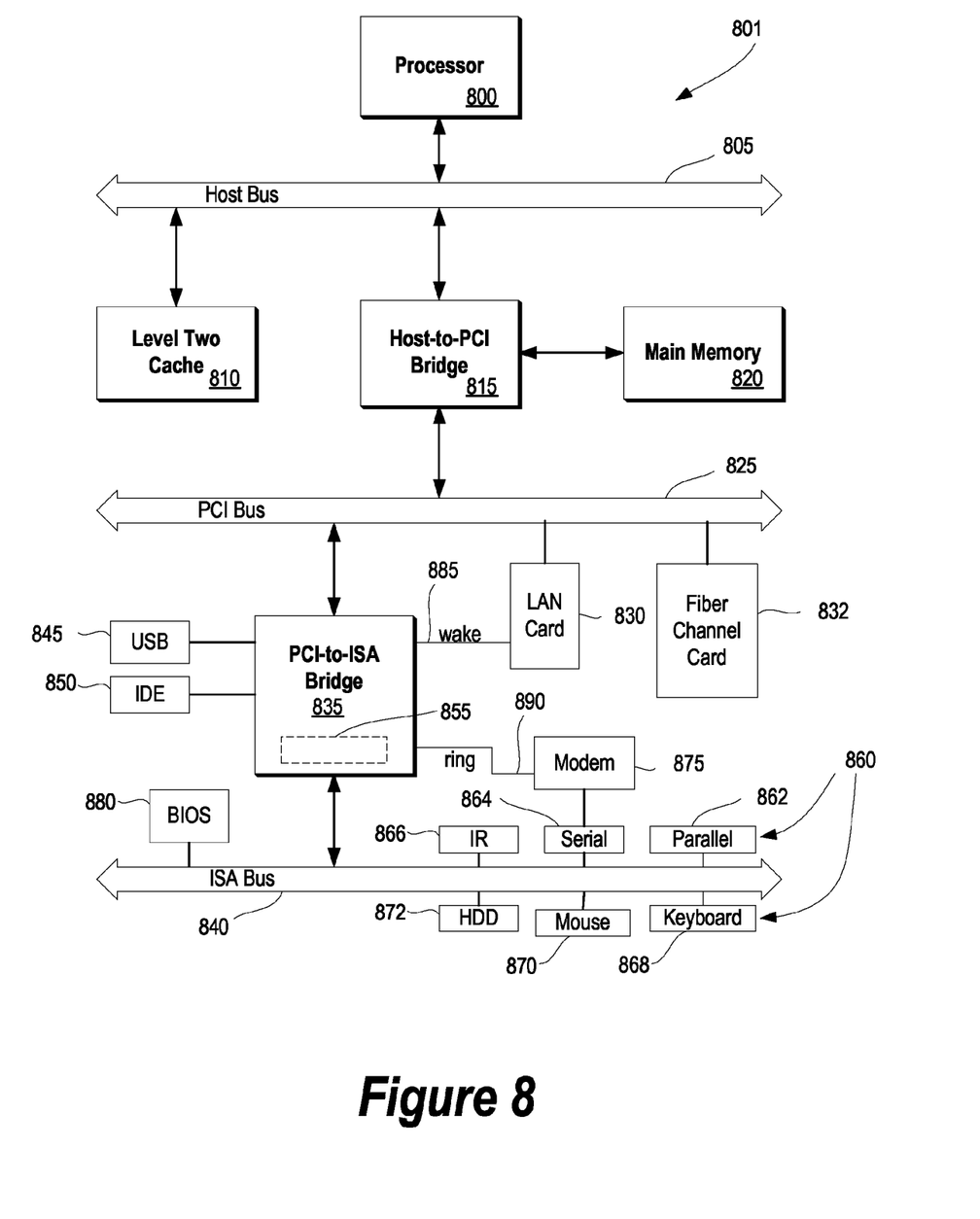
FIG. 8 is a block diagram of an information handling system capable of implementing the present invention.

FIG. 8 illustrates information handling system 801 which is a simplified example of a computer system capable of performing the invention described herein. Computer system 801 includes processor 800 which is coupled to host bus 805. A level two (L2) cache memory 810 is also coupled to the host bus 805. Host-to-PCI bridge 815 is coupled to main memory 820, includes cache memory and main memory control functions, and provides bus control to handle transfers among PCI bus 825, processor 800, L2 cache 810, main memory 820, and host bus 805. PCI bus 825 provides an interface for a variety of devices including, for example, LAN card 830. PCI-to-ISA bridge 835 provides bus control to handle transfers between PCI bus 825 and ISA bus 840, universal serial bus (USB) functionality 845, IDE device functionality 850, power management functionality 855, and can include other functional elements not shown, such as a real-time clock (RTC), DMA control, interrupt support, and system management bus support. Peripheral devices and input/output (I/O) devices can be attached to various interfaces 860 (e.g., parallel interface 862, serial interface 864, infrared (IR) interface 866, keyboard interface 868, mouse interface 870, and fixed disk (HDD) 872) coupled to ISA bus 840. Alternatively, many I/O devices can be accommodated by a super I/O controller (not shown) attached to ISA bus 840.

BIOS 880 is coupled to ISA bus 840, and incorporates the necessary processor executable code for a variety of low-level system functions and system boot functions. BIOS 880 can be stored in any computer readable medium, including magnetic storage media, optical storage media, flash memory, random access memory, read only memory, and communications media conveying signals encoding the instructions (e.g., signals from a network). In order to attach computer system 801 to another computer system to copy files over a network, LAN card 830 is coupled to PCI bus 825 and to PCI-to-ISA bridge 835. Similarly, to connect computer system 801 to an ISP to connect to the Internet using a telephone line connection, modem 875 is connected to serial port 864 and PCI-to-ISA Bridge 835.

While the computer system described in FIG. 8 is capable of executing the invention described herein, this computer system is simply one example of a computer system. Those skilled in the art will appreciate that many other computer system designs are capable of performing the invention described herein.

One of the preferred implementations of the invention is a client application, namely, a set of instructions (program code) in a code module that may, for example, be resident in the random access memory of the computer. Until required by the computer, the set of instructions may be stored in another computer operable storage medium, for example, in a hard disk drive, or in a removable memory such as an optical disk (for eventual use in a CD ROM) or floppy disk (for eventual use in a floppy disk drive). The set of instructions may also be downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of authorizing a client's request at a first downstream application, said method comprising:
   at runtime, prior to receiving the client's request:
      identifying a role mapping requirement included in an upstream application, the role mapping requirement corresponding to an upstream security role; and
      in response to identifying the role mapping requirement, adding an upstream security role identifier corresponding to the upstream security role into a downstream authorization table;
   receiving, at the first downstream application, a first application request from the upstream application, wherein the first application request is derived from the client's request and includes the upstream security role identifier that was determined by the upstream application;
   matching the upstream security role identifier included in the first application request with the upstream security role identifier included in the downstream authorization table; and
   authorizing the client's request at the downstream application in response to the matching.

2. The method as described in claim 1 further comprising:
   identifying one or more required downstream security roles, wherein each authorization table entry included in the downstream authorization table corresponds to at least one of the required downstream security roles.

3. The method as described in claim 2 further comprising:
   selecting the required downstream security role that corresponds to the matched upstream security role identifier;
   including the selected required downstream security role in a second application request; and
   sending the second application request to a second downstream application.

4. The method as described in claim 1 further comprising:
   determining whether the upstream security role and the downstream security role are equivalent; and
   configuring the upstream security role and the downstream security role such that they are equivalent.

5. The method as described in claim 1 wherein the first application request is received over a computer network.

6. A method comprising:
   expanding, at runtime, an upstream security role to include a downstream application, the method further comprising:
      identifying a role mapping requirement included in an upstream application corresponding to the upstream security role;
      in response to identifying the role mapping requirement, selecting an upstream authorization table that corresponds to the upstream application, wherein the upstream authorization table includes one or more upstream authorization table entries that correspond to the upstream security role;
      selecting a downstream security role included in a downstream authorization table, the downstream security role corresponding to the role mapping requirement and the downstream application; and
      adding one or more downstream authorization table entries to the downstream authorization table, wherein the one or more added downstream authorization table entries match the one or more upstream authorization entries corresponding to the upstream security role.

7. The method as described in claim 6 wherein at least one of the added downstream authorization table entries is selected from the group consisting of a user identifier, a group identifier, and an upstream security role identifier.

8. The method as described in claim 6 further comprising:
   determining whether the upstream security role and the downstream security role are equivalent; and
   configuring the downstream authorization table entries and one or more of the upstream authorization table entries such that they are equivalent, the upstream authorization table entries corresponding to the upstream security role.

9. The method as described in claim 6 further comprising:
   receiving an application request from the upstream application, wherein the request includes a user identifier;
   matching the user identifier with one or more of the downstream authorization table entries; and
   authorizing the application request in response to the matching.

10. An information handling system comprising:
    one or more processors;
    a memory accessible by the processors;
    one or more nonvolatile storage devices accessible by the processors; and
    a client authorization tool to authorize a client's request at a first downstream application, the client authorization tool including a set of instructions stored in the memory and executed by at least one of the processors in order to perform actions of:
       at runtime, prior to receiving the client's request:
          identifying a role mapping requirement included in an upstream application, the role mapping requirement corresponding to an upstream security role; and
          in response to identifying the role mapping requirement, adding an upstream security role identifier corresponding to the upstream security role into a downstream authorization table;
       receiving, at the first downstream application, a first application request from the upstream application, wherein the first application request is derived from the client's request and includes the upstream security role identifier that was determined by the upstream application;
       matching the upstream security role identifier included in the first application request with the upstream security role identifier included in the downstream authorization table; and
       authorizing the client's request at the downstream application in response to the matching.

11. The information handling system as described in claim 10 wherein the set of instructions, when executed by one of the processors, further performs actions of:

identifying one or more required downstream security roles located in one of the nonvolatile storage devices wherein each authorization table entry included in the downstream authorization table corresponds to at least one of the required downstream security roles.

12. The information handling system as described in claim 11 wherein the set of instructions, when executed by one of the processors, further performs actions of:

selecting the required downstream security role that corresponds to the matched upstream security role identifier;

including the selected required downstream security role in a second application request; and sending the second application request to a second downstream application.

13. The information handling system as described in claim 10 wherein the set of instructions, when executed by one of the processors, further performs actions of:

determining whether the upstream security role and the downstream security role are equivalent; and configuring the upstream security role and the downstream security role such that they are equivalent.

14. The information handling system as described in claim 10 wherein the first application request is received over a computer network.

15. A computer program product stored on a computer operable storage medium for authorizing a client's request at a first downstream application, said computer program product comprising functional descriptive material that, when executed by an information handling system, causes the information handling system to perform actions that include:

at runtime, prior to receiving the client's request:

identifying a role mapping requirement included in an upstream application, the role mapping requirement corresponding to an upstream security role; and in response to identifying the role mapping requirement, adding an upstream security role identifier corresponding to the upstream security role into a downstream authorization table;

receiving, at the first downstream application, a first application request from the upstream application, wherein the first application request is derived from the client's request and includes the upstream security role identifier that was determined by the upstream application;

matching the upstream security role identifier included in the first application request with the upstream security role identifier included in the downstream authorization table; and authorizing the client's request at the downstream application in response to the matching.

16. The computer program product as described in claim 15 wherein the functional descriptive material that, when executed by the information handling system, causes the information handling system to further perform actions that include:

identifying one or more required downstream security roles wherein each authorization table entry included in the downstream authorization table corresponds to at least one of the required downstream security roles.

17. The computer program product as described in claim 16 wherein the functional descriptive material that, when executed by the information handling system, causes the information handling system to further perform actions that include:

selecting the required downstream security role that corresponds to the matched upstream security role identifier;

including the selected required downstream security role in a second application request; and sending the second application request to a second downstream application.

18. The computer program product as described in claim 15 wherein the functional descriptive material that, when executed by the information handling system, causes the information handling system to further perform actions that include:

determining whether the upstream security role and the downstream security role are equivalent; and configuring the upstream security role and the downstream security role such that they are equivalent.

19. The computer program product as described in claim 15 wherein the first application request is received over a computer network.

* * * * *